(12) United States Patent
Sasahara et al.

(10) Patent No.: US 6,835,488 B2
(45) Date of Patent: Dec. 28, 2004

(54) FUEL CELL WITH PATTERNED ELECTROLYTE/ELECTRODE INTERFACE

(75) Inventors: Jun Sasahara, Wako (JP); Suk Won Cha, Stanford, CA (US); Amy Chang-Chien, Stanford, CA (US); Tadahiro Kubota, Wako (JP); Nariaki Kuriyama, Wako (JP); Sang-Joon J. Lee, Stanford, CA (US); Yaocheng Liu, Stanford, CA (US); Ryan O'Hayre, Stanford, CA (US); Friedrich B. Prinz, Stanford, CA (US); Yuji Saito, Wako (JP)

(73) Assignees: Honda Giken Kogyo Kabushiki Kaisha, Tokyo (JP); Stanford University, Palo Alto, CA (US)

( * ) Notice: Subject to any disclaimer, the term of this patent is extended or adjusted under 35 U.S.C. 154(b) by 421 days.

(21) Appl. No.: 09/850,411

(22) Filed: May 8, 2001

(65) Prior Publication Data

US 2002/0012825 A1 Jan. 31, 2002

Related U.S. Application Data

(60) Provisional application No. 60/202,827, filed on May 8, 2000, and provisional application No. 60/242,136, filed on Oct. 23, 2000.

(51) Int. Cl.[7] ............................................. H01M 2/14
(52) U.S. Cl. .......................... 429/39; 429/30; 429/33; 429/34; 429/36; 429/38; 429/39; 429/41
(58) Field of Search ............................ 429/20, 30, 33, 429/34, 36, 38, 39, 40, 41, 42, 44, 231.95; 216/52, 94; 264/292, 293, 296

(56) References Cited

U.S. PATENT DOCUMENTS

| | | | |
|---|---|---|---|
| 4,272,353 A | 6/1981 | Lawrance et al. | |
| 4,476,198 A | 10/1984 | Ackerman et al. | |
| 4,761,349 A | 8/1988 | McPheeters et al. | |
| 4,816,036 A | 3/1989 | Kotchick | |
| 5,234,776 A | 8/1993 | Koseki | |
| 5,252,410 A | 10/1993 | Wilkinson et al. | |
| 5,480,737 A | 1/1996 | Satake et al. | |
| 5,501,914 A | 3/1996 | Satake et al. | |
| 5,518,829 A | 5/1996 | Satake et al. | |
| 5,998,057 A | * 12/1999 | Koschany et al. | 429/42 |
| 6,087,028 A | * 7/2000 | Goto | 429/24 |
| 6,149,810 A | 11/2000 | Gonzalez-Martin et al. | |
| 6,361,893 B1 | * 3/2002 | George et al. | 429/31 |

* cited by examiner

*Primary Examiner*—Bruce F. Bell
(74) *Attorney, Agent, or Firm*—Arent Fox PLLC

(57) ABSTRACT

A fuel cell contains an electrolyte sheet sandwiched between two electrodes. One or both electrode/electrolyte interfaces includes mesoscopic three-dimensional features in a prescribed pattern. The features increase the surface area-to-volume ratio of the device and can be used as integral channels for directing the flow of reactant gases to the reaction surface area, eliminating the need for channels in sealing plates surrounding the electrodes. The electrolyte can be made by micromachining techniques that allow very precise feature definition. Both selective removal and mold-filling techniques can be used. The fuel cell provides significantly enhanced volumetric power density when compared with conventional fuel cells.

22 Claims, 10 Drawing Sheets

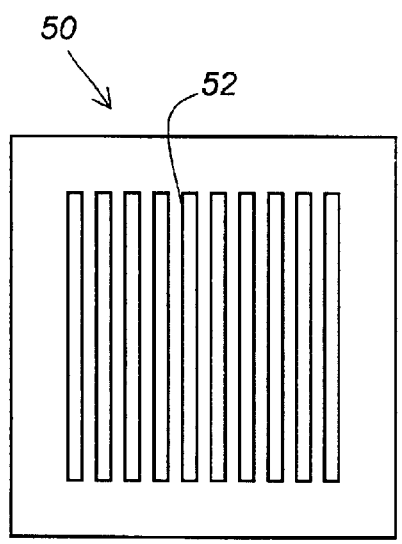
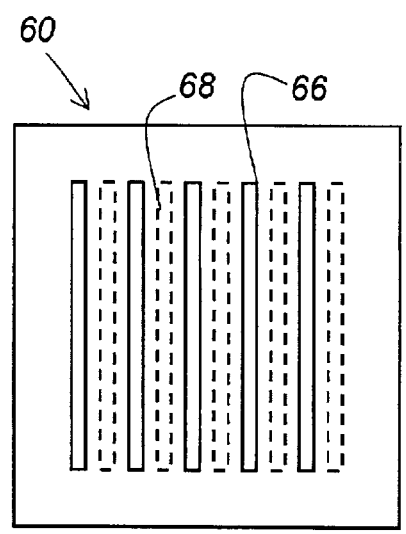
FIG. 3A
FIG. 4A
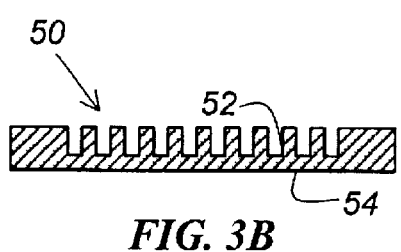
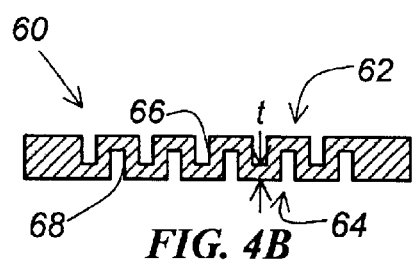
FIG. 3B
FIG. 4B

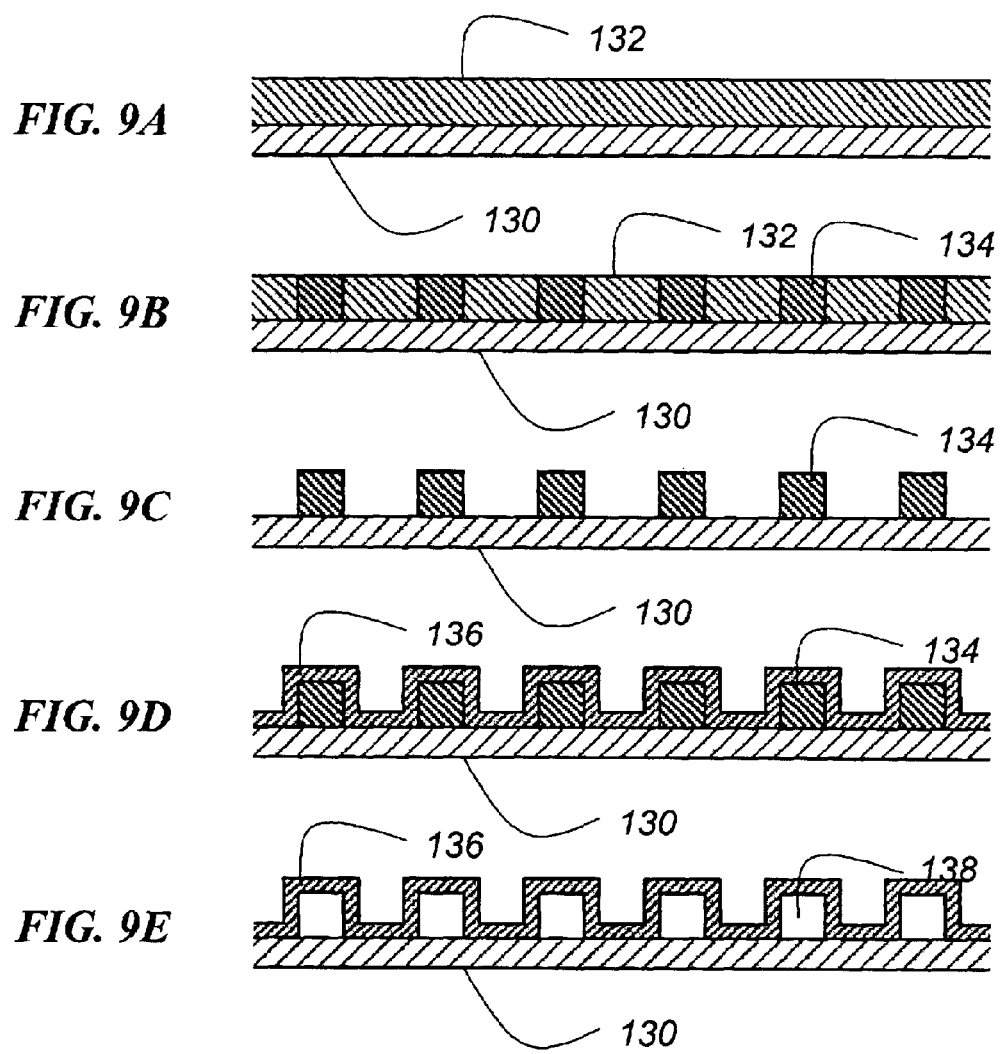

FUEL CELL WITH PATTERNED ELECTROLYTE/ELECTRODE INTERFACE

CROSS-REFERENCE TO RELATED APPLICATIONS

This application claims the benefit of U.S. Provisional Application No. 60/202,827, filed May 8, 2000, and 60/242,136, filed Oct. 23, 2000, both of which are herein incorporated by reference.

FIELD OF THE INVENTION

This invention relates generally to fuel cells. More particularly, it relates to a fuel cell with an electrode/electrolyte interface having mesoscale three-dimensional features that provide an increased reaction surface area-to-volume ratio.

BACKGROUND ART

Fuel cells are electrochemical devices that are becoming increasingly popular as power sources because of their high power density and ease of scaling. In addition, in the case of hydrogen-oxygen fuel cells, water is the only emission. Fuel cells convert chemical energy directly into electrical energy, and are therefore much more efficient than, for example, internal combustion engines.

A typical prior art fuel cell 10 is shown in FIG. 1. A solid electrolyte 12, typically a polymer membrane or solid oxide, is sandwiched between a porous anode 14 and cathode 16. A catalyst (not shown) such as platinum is fixed at both electrolyte/electrode interfaces. Adjacent to the electrodes are plates 18 and 20, typically made of graphite, that serve as both flow routers for the gases and current collectors for generated electrons. The separator plates 18 and 20 also provide mechanical support for the electrodes and electrolyte, and may also include channels for discharge of water.

In operation of a hydrogen-oxygen fuel cell, hydrogen enters through an inlet and is routed through channels 22 in the top plate 18 and through the anode 14. Upon contact with the catalyst particles at the anode/electrolyte interface, the hydrogen dissociates into electrons and protons. The protons pass through the electrolyte 12, while the electrons flow through an external circuit via the anode 14 and current collecting plate 18. Oxygen enters the cell through a separate inlet and is routed through channels 24 in the bottom plate 20 and through the cathode 16. At the cathode/electrolyte interface, oxygen combines with the electrons from the external circuit and the protons flowing through the electrolyte 12 to produce water. The channels 22 and 24 can also be used to remove water from the cathode 16. Because each fuel cell 10 can provide only about 1 V, a number of fuel cells are combined in series to provide sufficient power for the intended application.

Current work in fuel cell design aims to provide smaller, lighter, more efficient, and less expensive devices. For example, platinum is very expensive, and so providing alternative catalysts and increased catalytic surface area are desirable. More efficient gas flow routing with lighter current collection plates is also desired. For an explanation of the importance of flow field design, see U.S. Pat. No. 5,686,199, issued to Cavalca et al. In addition, an optimal water level that keeps the polymer membrane hydrated while allowing for efficient removal of water from the cathode catalyst sites is required.

U.S. Pat. No. 5,252,410, issued to Wilkinson et al., discloses a fuel cell with integral reactant flow passages in the electrode layers, thereby eliminating the need for heavier separator plates containing channels for flowing the reactant gases. The resulting fuel cell has a higher power-to-volume ratio than conventional fuel cells having reactant flow passages in the separator plates. Similar advantages are provided by a fuel cell system disclosed in U.S. Pat. No. 5,234,776, issued to Koseki. The fuel cell of Koseki includes ribs formed in the electrodes or electrode chambers. The ribs provide efficient water and reactant gas distribution. While both of these patents provide advantages in reactant distribution and water management, they do not address problems of catalyst or reaction surface area.

U.S. Pat. No. 6,149,810, issued to Gonzalez-Martin et al., provides a proton exchange membrane having internal passages parallel to the membrane surface. When used in a fuel cell, water flows through the membrane to hydrate the membrane directly and thereby enhance proton transfer through the membrane. There is no routing of reactant gases by the membrane. The problems of gas distribution and reaction or catalyst surface area are not addressed.

U.S. Pat. No. 4,272,353, issued to Lawrance et al., discloses polymer electrolyte catalytic electrodes that are formed by roughening the surface of a solid polymer electrolyte and depositing a catalyst on the roughened surface. Compared with conventional electrodes, the electrodes of Lawrance et al. provide superior performance with significantly lower catalyst loading. Roughening is performed by abrading the membrane with, e.g., a silicon carbide sheet. In order to achieve the benefits of the invention, the polymer membrane must be abraded, preferably in two orthogonal directions, and not simply patterned by embossing or stamping.

U.S. Pat. No. 5,480,737, issued to Satake et al., provides a solid oxide electrolyte fuel cell containing a power generation layer including a fuel electrode, a solid oxide electrolyte, and an oxygen electrode. Both faces of the power generation layer contain dimples of specific height, diameter, and pitch. The dimples are designed to increase the reaction area while not hindering gas flow through the electrodes. The dimples are cylindrically shaped; Satake et al. do not recommend rectangular shaped dimples, which would create too large a pressure drop in the reactant gases. Even with cylindrical dimples, the aspect ratio is constrained to particular values to prevent significant pressure drop. The dimples are formed in a regularly repeating pattern that is fabricated by pressing the layer in metal molds before it is fired. A drawback of the dimple array design of Satake et al. is its inability to manage dead zones, areas across the major surface in which mass-displacement flow is insufficient. Very little reaction occurs in dead zones, which typically occur in corners, behind the location at which the inlet flow fans out, and at the location where the exit flow constricts.

U.S. Pat. No. 4,816,036, issued to Kotchick, discloses a solid oxide fuel cell containing fuel and oxidant passageways extending through the core of the fuel cell. A trilayer structure containing the anode, electrolyte, and cathode is corrugated to form the reactant passageways. As a result, the device provides increased power density. However, because of the parallel structure of the passageways, the fuel cell requires large manifolds at the ends of the passageways to direct gas flow. Although the fuel and oxidant flow can be in opposite directions, all of the fuel flow and all of the oxidant flow must be in the same direction.

A similar structure is provided in U.S. Pat. No. 4,761,349, issued to McPheeters et al., which discloses a solid oxide fuel cell having a corrugated monolithic core defining reactant flow channels. As with the device of Kotchick, bulky inlet and outlet housings are required to direct the reactant flow into appropriate channels, and all of the fuel or oxidant channels provide flow in one direction only.

Although the prior art fuel cells provide improvements over conventional fuel cells, further improvements in device efficiency are still desired.

OBJECTS AND ADVANTAGES

Accordingly, it is a primary object of the present invention to provide a fuel cell with a high reaction surface area-to-volume ratio and therefore a high volumetric power density.

It is a further object of the invention to provide a fuel cell with efficient routing of reactant gases. The routing is provided by the shape of the membrane and not with additional separation plates, resulting in a very lightweight device.

It is an additional object of the invention to provide a fuel cell with efficient management of water by channels integral to the electrolyte.

It is another object of the present invention to provide a fuel cell electrolyte having three-dimensional features that provide structural rigidity to the device, thereby reducing overall device size.

SUMMARY

These objects and advantages are attained by a fuel cell having three-dimensional features at one or both electrode/electrolyte interface. The features are in a prescribed pattern that can be created using known and novel micromachining techniques. The features provide increased reaction surface area-to-volume ratio, integral reactant flow channels, and enhanced structural rigidity, thereby allowing for significantly decreased device size.

Specifically, the present invention provides a fuel cell having two electrodes and an electrolyte sheet sandwiched between the electrodes, thereby defining first and second interfaces. One or both interface has three-dimensional features in a prescribed pattern. Preferably, the features are designed to direct a flow of reactants from an inlet region to an outlet region of the fuel cell, such that the inlet and outlet regions each communicate with only a portion of the three-dimensional features. One method for forming the features is selective removal of material, but other suitable methods can be used. The features have a depth-to-width aspect ratio of at least 1:2 and a width of between 5 and 500 $\mu$m. The ratio of the surface area of the patterned interface to the projected surface area of the patterned interface is preferably greater than approximately 2.

Preferably, both the first and second interfaces are patterned with first and second prescribed patterns. The two patterns can be complementary such that the thickness of the electrolyte sheet between the two patterns is approximately constant. The two patterns can also be different from each other, with each design dependent on the type of reactant contacting the interface. Each patterned interface can also contain an additional pattern superimposed on the prescribed pattern. The prescribed pattern and the additional pattern have different length scales.

The electrolyte can be a polymer than is used as a proton-exchange membrane, in which case it is shaped by a method such as direct casting, injection molding, embossing, laser machining, laminated layer assembly, selective plasma etching, blow molding, and autoclaving. Alternatively, the electrolyte can be a solid oxide used as an ion-exchange membrane, in which case it is shaped by a method such as chemical vapor deposition, gel casting, powder sintering, or sol-gel processing. The electrode can include a conductive grid or porous conductive material that conformably contacts the membrane and catalyst.

The present invention also provides a method for making a fuel cell, including the steps of providing a substrate and selectively removing predetermined regions of the substrate using a micromachining technique, thereby creating three-dimensional features of width between 5 and 500 $\mu$m in the substrate. Suitable selective removal techniques include laser machining and selective plasma etching. In an alternative method, a mold having three-dimensional features of rectangular cross-section is provided, and the mold is filled with an electrolyte precursor. For example, the method can be direct casting, injection molding, embossing, blow molding, autoclaving, chemical vapor deposition, powder sintering, or sol-gel processing. The mold can also be filled with a sacrificial material that is removed after the electrolyte precursor is added to the mold.

BRIEF DESCRIPTION OF THE FIGURES

FIGS. 3A–3B are top plan and cross-sectional views, respectively, of one embodiment of a patterned electrolyte of the present invention.

FIGS. 4A–4B are top plan and cross-sectional views, respectively, of a second embodiment of a patterned electrolyte of the present invention, showing complementary patterns.

FIGS. 9A–9E illustrate a process sequence involving a sacrificial material used to create void regions within an electrolyte.

DETAILED DESCRIPTION

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

Figure 2:
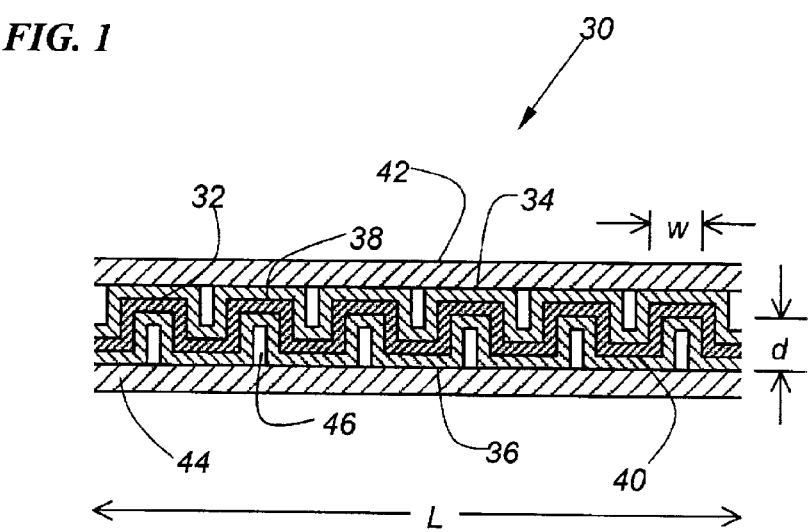
FIG. 2 is a cross-sectional view of a fuel cell of the present invention containing a patterned electrolyte.

FIG. 2 is a cross-sectional view of a fuel cell 30 of the present invention containing an electrolyte sheet 32 sandwiched between an anode 34 and cathode 36. As used herein, a sheet is an object having two dimensions that are significantly larger than the third dimension. Two interfaces 38 and 40 are defined between the electrolyte 32 and anode 34 and between the electrolyte 32 and cathode 36, respectively. The electrodes are surrounded by substantially planar sealing plates 42 and 44 that seal channels 46 in the electrode/electrolyte structure. Not shown is a catalyst, typically platinum, at the interfaces 38 and 40. As known to anyone of ordinary skill in the art, the catalyst may be mixed with another substance, such as carbon powder, to increase the active area within this catalyst layer on a fine scale, typically measured in nanometers.

The electrolyte sheet 32 is typically a polymer electrolyte that serves as a proton-exchange membrane, such as Nafion® from Dupont. Alternatively, the electrolyte sheet 32 can be a solid oxide such as yttria-stabilized zirconia (YSZ) that serves as an ion-exchange membrane.

As shown, both interfaces 38 and 40 contain three-dimensional features having an approximately rectangular cross section of depth d and width w. While rectangular cross-sectional features are preferred for ease of manufacture, it will be apparent to those of average skill in the art that the invention can be practiced with differently shaped features. Typical values of width w are between 5 and 500 $\mu$m. Typical values of depth d are between 1 $\mu$m and 5 mm. Thus the depth-to-width aspect ratio is preferably, but not limited to, between 1:2 and 10:1. This range of feature size is typically referred to as mesoscale. Any nanoscale surface area enhancement within the catalyst-loaded interfaces 38 and 40 supplement the area enhancement in the mesoscale range.

The three-dimensional features at the interfaces 38 and 40 are in a prescribed pattern. That is, the features are not created arbitrarily, but are rather created using methods that can produce features in a known pattern. This is in direct contrast to features formed by, for example, roughening the surface of an electrolyte. Abrading a surface to remove material necessarily produces features in a random pattern.

Figure 1:
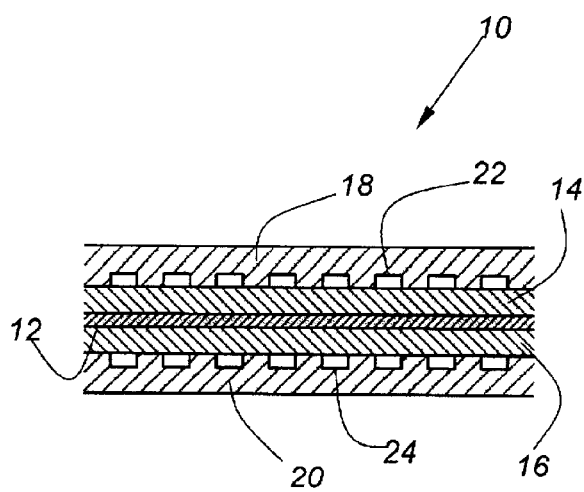
FIG. 1 is a cross-section schematic representation of a prior art fuel cell.

The projected surface area per unit length (out of the page) of each interface has a value of L, indicated in FIG. 2. The total surface area per unit length is significantly greater than L, preferably at least 2 L. Comparing the fuel cell 30 in FIG. 2 with the prior art fuel cell 10 in FIG. 1 reveals that the fuel cell 30 of the present invention provides approximately double the reaction surface of the prior art fuel cell 10 in approximately equivalent volume. The reaction surface area is a region of a fuel cell containing an interface among an electron path, a proton path (the electrolyte), and a catalyst. Because fuel cell performance is largely determined by the current produced per unit area, increasing the reaction surface area can significantly increase the power density per unit volume of the device.

Note also that the function of prior art channels 22 and 24 in the separator plates are satisfied by channels 46 defined by the three-dimensional features of the interfaces. It is therefore not necessary to provide additional channels in the plates 42 and 44. The three-dimensional features of the interface also provide structural rigidity that is provided by the separator plates of the prior art, allowing the total device volume to be reduced even further.

Any type of prescribed pattern of the three-dimensional features is within the scope of the present invention. However, particular patterns are preferable for different purposes. FIG. 3A is a plan view of an electrolyte 50 of the present invention that is part of a fuel cell containing three-dimensional features at one of the two electrode/electrolyte interfaces. FIG. 3B is a corresponding cross-sectional view of the electrolyte 50. Three-dimensional features of the electrolyte surface define parallel channels 52 through which gas flow can be directed. In this embodiment, only one of the reactant gases flows through the channels 52, while the other reactant contacts the flat surface 54 of the electrolyte 50.

FIGS. 4A and 4B are plan and cross-sectional views, respectively, of an alternative embodiment of the present invention, an electrolyte 60. The electrolyte 60 has two surfaces, one of which contains a first pattern 62, and the other of which contains a second pattern 64. The first pattern 62 contains channels 66, and the second pattern 64 contains channels 68. The channels 66 direct the flow of a first reactant gas, and the channels 68 direct the flow of a second reactant gas. The patterns 62 and 64 are said to be complementary patterns. That is, over the regions covered by the first and second patterns 62 and 64, the electrolyte sheet 60 has a substantially uniform thickness t.

Figure 5A:
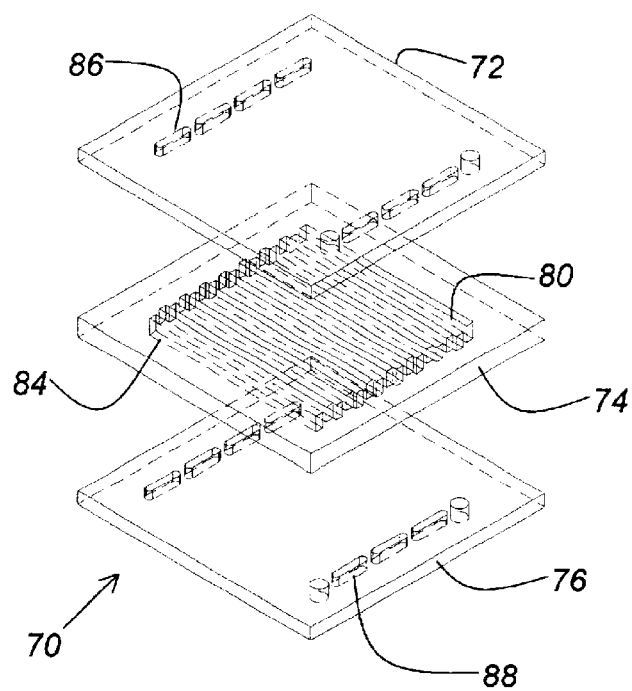
FIGS. 5A–5C are exploded isometric, top plan, and exploded cross-sectional views, respectively, of a fuel cell of the present invention containing integrated channels for reactants within the electrolyte structure and thin, flat end plates for sealing the reactant chambers.
Figure 5B:
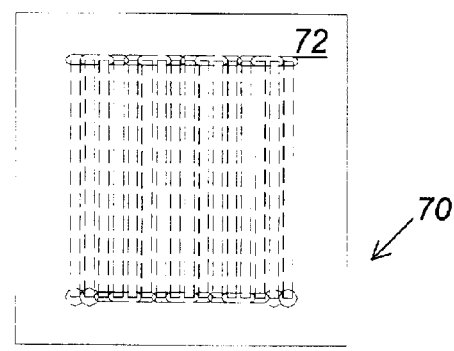
Figure 5C:
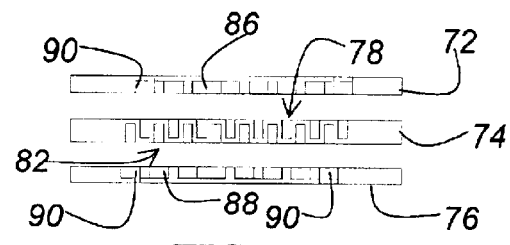

FIGS. 5A–5C are an exploded isometric view, top plan view, and exploded cross-sectional view, respectively, of a fuel cell 70 of the present invention. The fuel cell 70 contains a top sealing plate 72, a electrode/electrolyte structure 74, and a bottom sealing plate 76. As best shown in FIG. 5C, the electrode/electrolyte interfaces in the structure 74 contain complementary patterns of three-dimensional features. A first pattern 78 defines parallel channels 80 in the structure 74, while a second pattern 82 defines parallel channels 84 in the structure 74. Reactants flow along the length of the channels 80 and 84. Small cross-channels 86 in the sealing plate 72 link the channels 80 together so that a first reactant gas can access the entire reaction surface area in the first interface of the structure 74. Similarly, small cross-channels 88 in the sealing plate 76 link the channels 84 together so that a second reactant gas can access the entire reaction surface area in the second interface of the structure 74. Simple holes 90 provide inlet and outlet ports for the two reactant gases. The fuel cell 70 is designed so that the two reactant gases (fuel and oxidant) are maintained separate throughout operation.

Note that the inlet and outlet holes 90 do not communicate with all of the channels 80 or 84, but only communicate with a portion of the channels. In this case, the inlet and outlet holes 90 each communicate with only one channel. The fuel cell 70 therefore does not need complex manifolds to control and separate reactant gas flow at the ends of the channels. Note also that the sealing plates 72 and 76 are considerably smaller than flow plates used in conventional fuel cells, because the small cross-channels 86 and 88 do not require as much material removal as do serpentine passages machined directly in prior art flow plates.

Figure 6:
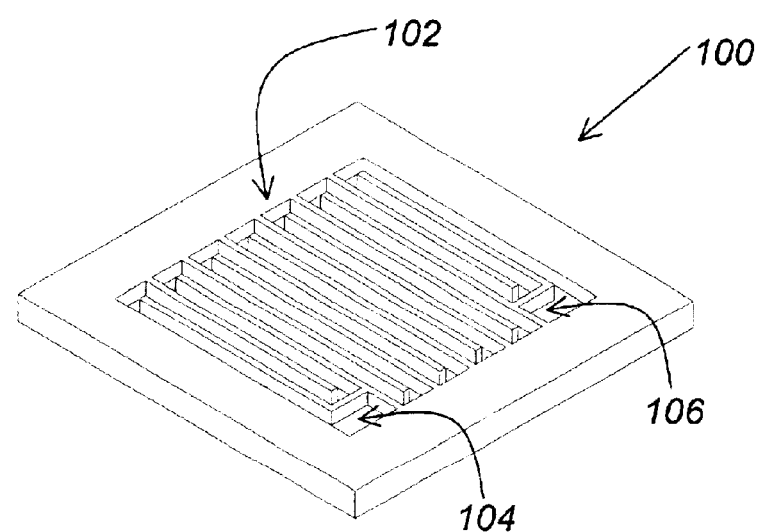
FIG. 6 is an isometric view of an electrolyte of the present invention having integral flow passages for directing reactant flow from an inlet to an outlet.

FIG. 6 is an isometric view of an alternative embodiment of an electrolyte 100 of the present invention. A pattern 102 in the top surface of the electrolyte 100 directs a flow of reactants from an inlet region 104 to an outlet region 106 of the fuel cell. That is, the pattern 102 defines integrated channels for reactants within the electrolyte 100. When incorporated into a fuel cell, the electrolyte 100 is sandwiched between two electrodes, and the entire structure is sandwiched between thin, flat end plates (not shown) that seal the reactant chambers. Unlike the fuel cell 70 of FIG. 5, machining of cross-channels in the end plates is not required, thereby reducing the overall bulk of the fuel cell.

Figure 7A:
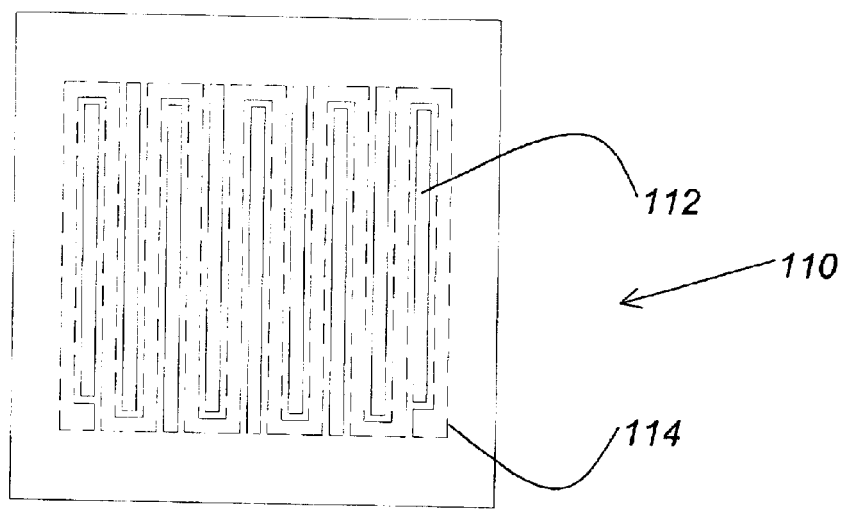
FIGS. 7A–7B are top plan and isometric views, respectively, of an air-breathing electrolyte of the present invention, showing different first and second patterns.
Figure 7B:
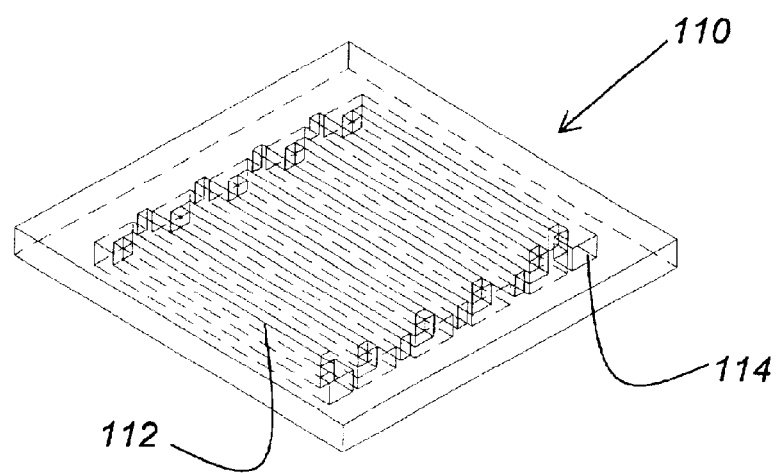

FIGS. 7A and 7B are top plan and isometric views, respectively, of an electrolyte 110 according to an additional alternative embodiment of the present invention. The solid lines of FIGS. 7A and 7B represent channels 112 in the top surface of the electrolyte 110. The dashed lines represent serpentine channels 114 in the bottom surface of the electrolyte 110. In this particular example, the first and second patterns in the two interfaces are different from each other: the first pattern contains parallel channels, while the second patter contains continuous serpentine channels. The electrolyte 110 can be used in a fuel cell in which oxygen is obtained from air, referred to as an air-breathing configuration. The top channels 112 are open to extract oxygen from air, while the bottom channels 114 are capped by a sealing plate such that the fuel gas follows the serpentine path of the channels 114. The electrolyte 110 of FIGS. 7A and 7B is a particular example of a fuel cell in which the interface pattern depends on the type of reactant contacting the interface. In this case, the fuel requires a pattern that directs the flow of the fuel, while the oxidant requires a pattern that allows the oxidant to be extracted from air.

Figure 8:
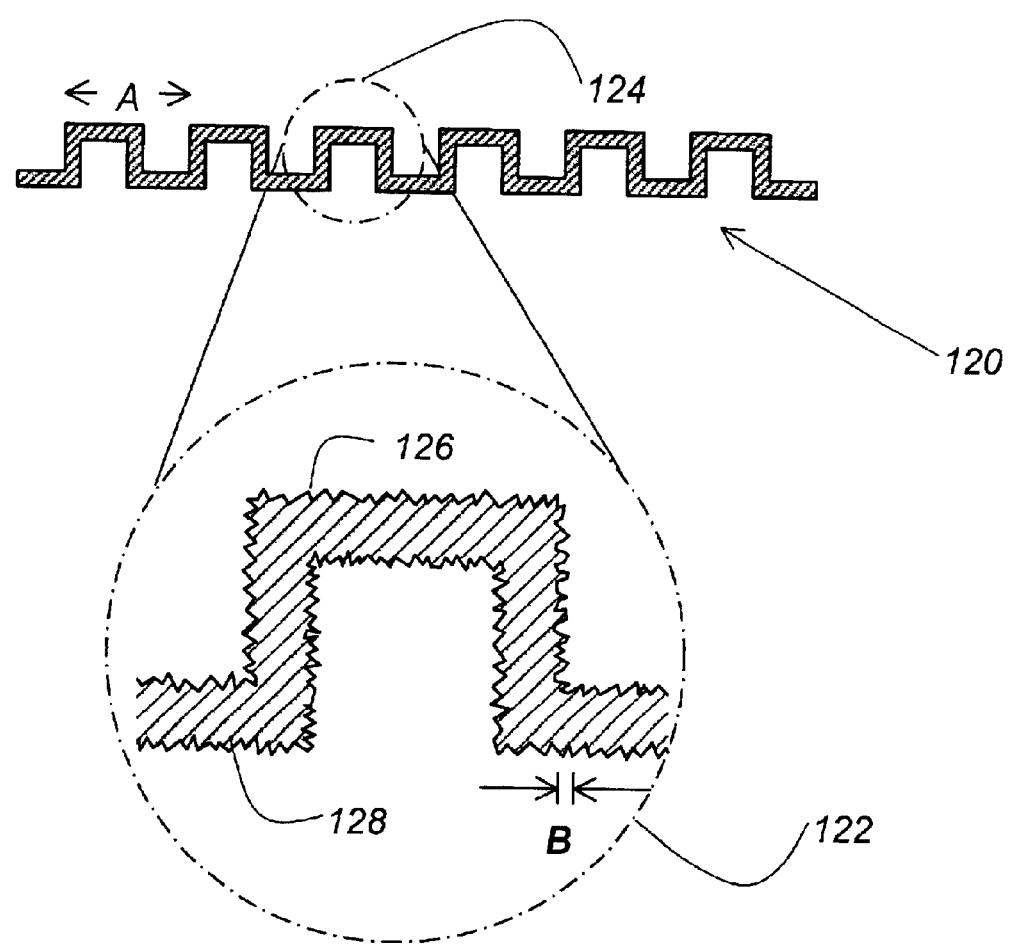
FIG. 8 is a cross-sectional view of an electrolyte of the present invention having superimposed first and second patterns of different length scales.

FIG. 8 is a cross-sectional view of an alternative embodiment of the invention, an electrolyte 120. The circle 122 contains a magnified version of the material in the circle 124. As shown, the electrolyte 120 contains two surfaces 126 and 128, each of which has a prescribed pattern and an additional pattern superimposed on the prescribed pattern. The first and second prescribed patterns (on the top surface 126 and bottom surface 128, respectively) are complementary patterns containing rectangular features of a particular length scale A. The additional pattern is surface roughness, which is not considered to be a prescribed pattern, because it contains random features. The additional pattern has an average length scale of B. The two length scales A and B are clearly different from one another. The additional pattern provides an additional increase in reaction surface area, while allowing for decreased catalyst loading. Any superposition of patterns of different length scale is within the scope of the present invention. Although FIG. 8 shows an additional pattern that is random, both prescribed additional patterns and random additional patterns are within the scope of the present invention.

An important feature of a fuel cell according to the present invention is that it can be manufactured using known and novel micromachining techniques that have been developed for other applications. These techniques provide the advantages of fine feature resolution, high repeatability, batch operations, integrated process sequences, and a variety of material transfer options. Any suitable micromachining method for manufacturing a fuel cell is within the scope of the present invention. Manufacturing methods may be categorized into four major categories: material removal, material addition, net-shaping, and deformation. Material removal techniques begin with an unpatterned sheet of electrolyte material and remove specific regions to obtain an electrolyte sheet with three-dimensional features. Examples of subtractive techniques include laser machining, focused ion-beam (FIB) milling, selective plasma etching, and mechanical abrasion. These methods are applicable to both polymer and solid oxide electrolyte materials. In some cases, regions that are not removed are covered with a mask.

Material addition techniques build the electrolyte material in small increments. The material can be added to a mold or substrate with predefined geometric features so that the resulting electrolyte assumes the shape of its underlying mold or substrate. Examples of material addition techniques include chemical vapor deposition, physical vapor deposition, and plasma spraying.

Net-shaping techniques begin with a precursor of the electrolyte material in a non-solid state. The non-solid material is introduced into a mold with predefined geometric features so that the resulting electrolyte assumes the shape of its underlying mold. The precursor material may or may not contain a solvent to achieve fluid properties, and the solvent is subsequently removed to leave the electrolyte in a solid state. If the electrolyte precursor consists of a particulate or powder material, then a subsequent treatment such as partial melting or sintering may be applied to establish solid structure. Examples of net-shaping techniques include direct casting, injection molding, screen printing, dip-coating, and sol-gel processing.

Deformation techniques include embossing, blow molding, centrifuge, and autoclaving. In some cases the definitions of the various categories may overlap, so the preceeding specific examples are given simply for illustrative purposes.

FIGS. 9A–9D are cross-sectional views illustrating a process sequence for making an electrolyte according to the present invention. This particular example uses a sacrificial material to create void regions within the electrolyte without having to subsequently remove the electrolyte from a substrate. FIG. 9A shows a substrate material 130 covered by a photosensitive sacrificial material 132. Specific examples include ultrathick photoresist, liquid soldermask, and dry-film soldermask. Commercially available ultrathick photoresists (e.g. Shipley AZ-series or Microchem SU-8) are commonly known to those skilled in the field of microelectromechanical systems (MEMS), and commercially available soldermask products (e.g. DuPont Vacrel or Riston products) are commonly known to those skilled in the field of printed circuit board fabrication. In FIG. 9B, regions 134 have been exposed to radiation, rendering them unsusceptible to a developer for removal. The unexposed regions 132 are removed, leaving the exposed regions 134, as shown in FIG. 9C. Depending on the nature of the photosensitive material, the inverse situation may apply, in which unexposed regions are hardened, and exposed regions are removed. The entire structure is then covered with the electrolyte material 136, as shown in FIG. 9D. Forming the electrolyte may be achieved by a conformal method such as chemical vapor deposition or dip-coating, or a two-step process involving casting for down-facing features followed by laser machining of up-facing features. Finally, the sacrificial material 134 is removed by a suitable solvent such as acetone for photoresist or dilute potassium hydroxide for dry-film soldermask to leave the electrolyte material 136 containing voids 138 on the substrate 130.

In an alternative method, an injection mold is created having both the first and second patterns, and the electrolyte material is injected into the mold. The mold is then removed to reveal the patterned electrolyte. This case is similar to direct casting, with the advantage of simultaneously forming features on both sides of the electrolyte. Typically the electrolyte precursor is injected with the aid of external pressure.

Note that a combination of subtractive and mold-filling techniques can be used. For example, a mold can be filled with electrolyte material to create the features on the bottom surface, and then regions of the top surface can be removed by, for example, laser machining, to create features on the top surface.

After the patterned electrolyte is created, the catalyst, typically platinum or platinum mixed with carbon, is deposited by a suitable method such as painting, spraying, or sputtering. Although the catalyst is conductive, it is most likely not a sufficient electron conductor. Additional conductive material must be deposited onto the catalyst for current collection. Any suitable conductive material serving as an electrode is within the scope of the present invention. The electrodes must contain sufficient void space for the reactants to flow through the electrodes with little flow resistance.

Figure 10A:
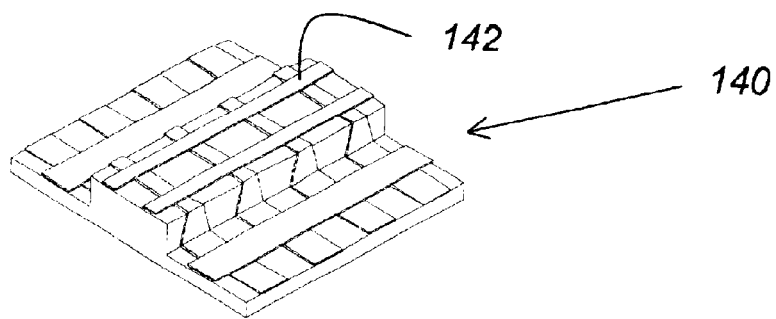
FIGS. 10A–10B are an assembled isometric view and an exploded isometric view, respectively, of one embodiment of a fuel cell of the present invention in which an electrically conductive grid is patterned on the surface of a three-dimensional electrode to enhance current collection.
Figure 10B:
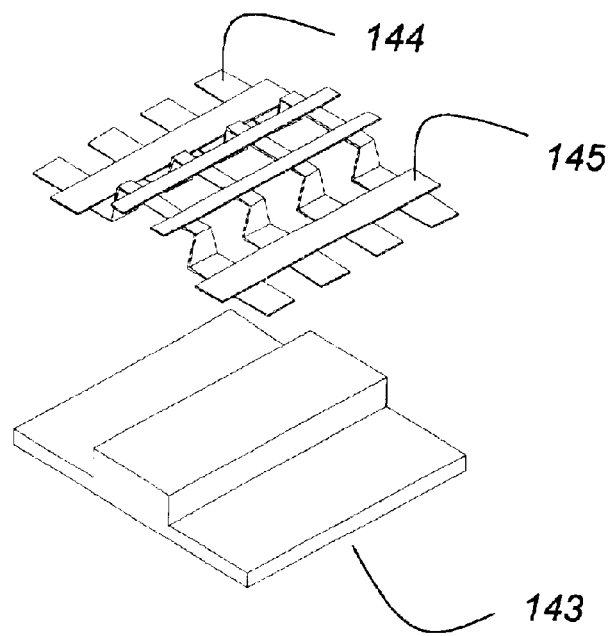

FIG. 10A shows a three-dimensional structure 140 as would be fabricated in the fuel cell of the present invention, containing a surface-conformal grid 142 of patterned electrically conductive material, and FIG. 10B shows an exploded isometric view of the same. The grid must have sufficient open area to allow the reactant gases to flow through the grid. An equally essential requirement, however, is sufficient continuity for electron conduction. Such a grid may be formed by physical vapor deposition of metal through one or more slotted shadow masks. In this example, one set of lines 144 is first patterned using a shadow mask having slots perpendicular to the mesa feature of the underlying structure 143. Subsequently, a second set of lines 145 is patterned with a different shadow mask having slots parallel to the mesa feature. Local regions of the sets of lines 144 and 145 may be narrower or wider than other regions, resulting from deposition scatter underneath the respective shadow masks.

A second embodiment is to coat the catalyst layer with a porous metal. For example, a solution of conductive material (e.g., metal such as gold) in a suitable solvent is coated onto the catalyst. The solvent evaporates, leaving a conformal layer of porous conductive material.

Figure 11:
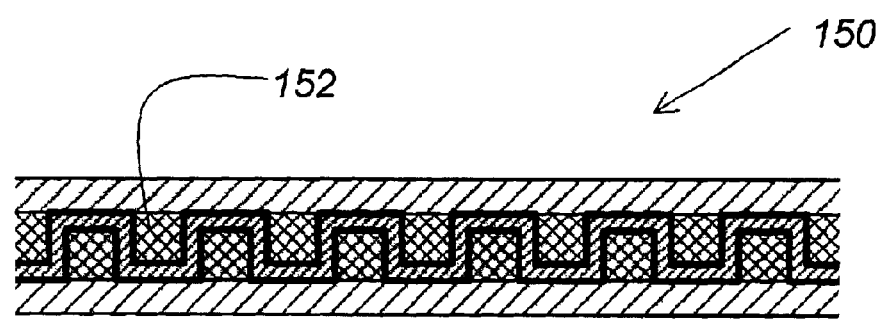
FIG. 11 is cross-sectional view of an alternative embodiment of a fuel cell of the present invention in which an electrically conductive open-cell structure fills the major cavities of the electrolyte.

FIG. 11 shows a third embodiment of a fuel cell 150. The channels defined by the interface features are filled with a conductive material having substantially open structure 152, such as a foam, sponge, or aerogel. The structure 152 provides a path for electron conduction away from the catalytically active region. In a very simple embodiment, the structure can be formed by lightly pressing a conductive powder such as carbon into the channels. The powder may be treated with a hydrophobic agent such as polytetraflouroethylene (PTFE) to promote water removal, according to methods well known by those skilled in the art.

Figure 12:
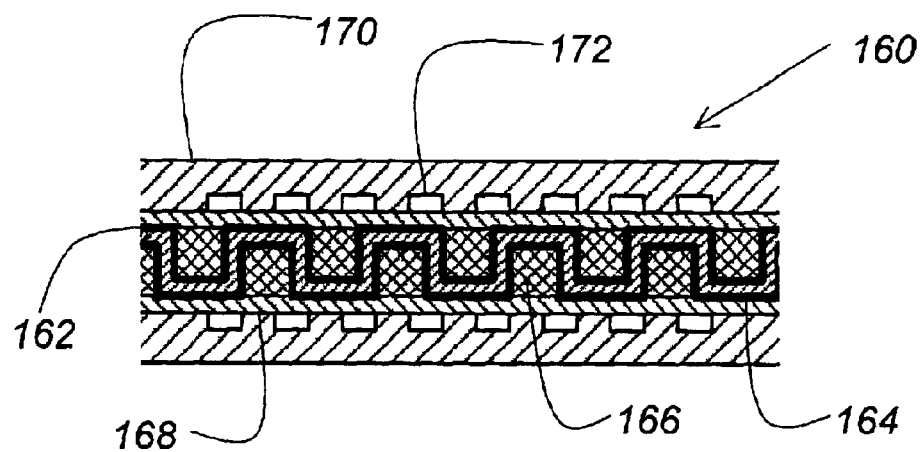
FIG. 12 is a cross-sectional view of a preferred implementation of a fuel cell of the present invention.

The present invention has been implemented as a hydrogen-oxygen fuel cell, depicted schematically in the cross-sectional view of FIG. 12. The fuel cell 160 shown is a preferred implementation and contains a patterned electrolyte 162, a sprayed catalyst 164, a carbon powder current collector 166 in the electrolyte channels, carbon paper electrodes 168, and a graphite flow structure 170 containing reactant flow channels 172 having typical width of 800 $\mu$m and typical depth of 800 $\mu$m. The cell size is approximately 5 $cm^3$. The electrolyte 162 is a polybenzimidazole membrane with channels 500 $\mu$m wide and 200 $\mu$m deep, and the channels are separated by 500 $\mu$m. The catalyst 164 is composed of a platinum-carbon mixture with a platinum loading of 0.2 $mg/cm^2$ across each side of the 5 $cm^2$ surface.

Figure 13A:
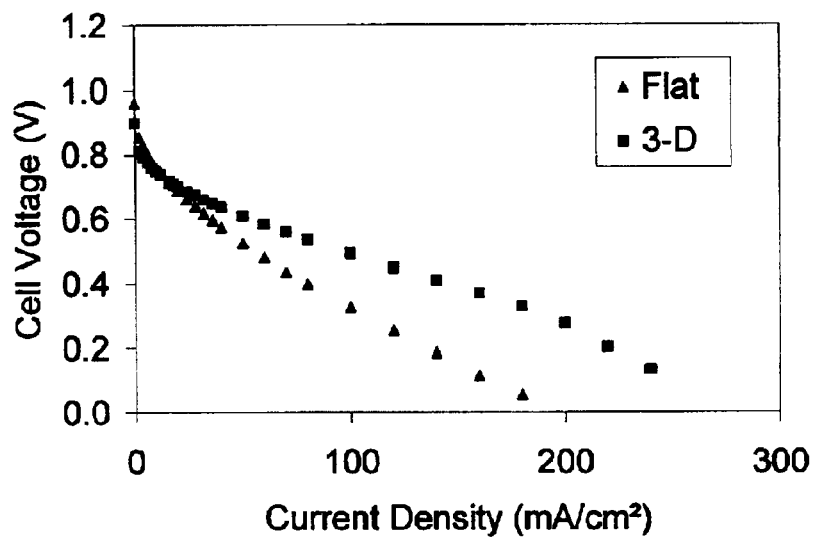
FIGS. 13A–13B are performance plots for a fuel cell similar to the fuel cell of FIG. 12, but containing only one patterned interface.
Figure 13B:
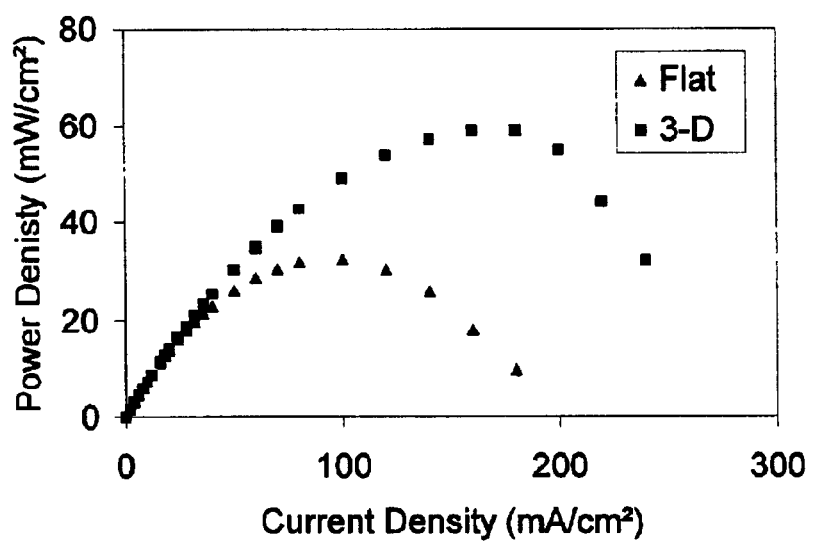

FIGS. 13A and 13B are performance plots for a fuel cell similar to the fuel cell 160 of FIG. 12, but containing three-dimensional features only on the cathode (oxygen) side. Operating conditions were 100 kPa of dry hydrogen, 100 kPa of dry oxygen, and a cell temperature of 90° C. FIG. 13A is a plot of cell voltage versus current density for a conventional flat (non-patterned) electrolyte and for the inventive fuel cell. The flat fuel cell has a thickness of approximately 100 $\mu$m. The inventive fuel cell also has an overall thickness of 300 $\mu$m, but the depth of the channels result in partial areas that are also approximately 100 $\mu$m. FIG. 13B shows power density versus current density for the same two fuel cells. The patterned electrolyte results in a maximum power density of 60 $mW/cm^2$, while the prior art fuel cell under similar conditions has a maximum power density of slightly over 30 $mW/cm^2$. The fuel cell of the present invention gives nearly twice the power per unit projected reaction surface area with less than twice the volume, and therefore clearly has a higher volumetric power density. It is expected that patterning both sides of the electrolyte will produce even better results (i.e., higher volumetric power density). The specific conditions in the experiments shown in FIGS. 13A and 13B are not optimal, but were arbitrarily selected and diligently conducted under identical conditions for both the inventive electrolyte and the flat baseline specimen, and the result is therefore deemed to be a fair comparison. One skilled in the art would be able to increase absolute performance by optimizing parameters such as reactant temperature, reactant humidity, catalyst loading, assembly force, electrolyte doping, and so forth.

It will be clear to one skilled in the art that the above embodiments may be altered in many ways without departing from the scope of the invention. Accordingly, the scope of the invention should be determined by the following claims and their legal equivalents.

What is claimed is:

1. A fuel cell comprising:
  a) two electrodes; and
  b) an electrolyte sheet sandwiched between said electrodes to form an electrode/electrolyte structure, thereby defining first and second interfaces between said electrolyte sheet and said electrodes, at least one of said interfaces having three-dimensional features in a prescribed pattern, wherein said prescribed pattern is selected to direct a flow of a reactant from an inlet region of said fuel cell to an outlet region of said fuel cell and wherein said prescribed pattern comprises a plurality of discrete channels for directing said reactant flow therethrough, and wherein said electrode/electrolyte structure has a substantially planar peripheral portion surrounding said three-dimensional features of said at least one of said interfaces, said fuel cell further comprising a sealing plate for contacting said substantially planar peripheral portion of said electrode/electrolyte structure to seal said channels.

2. The fuel cell of claim 1, wherein a ratio of a surface area of said at least one interface to a projected surface area of said at least one interface is greater than approximately 2.

3. The fuel cell of claim 1, wherein said first interface has three-dimensional structure in a first prescribed pattern and said second interface has three-dimensional structure in a second prescribed pattern.

4. The fuel cell of claim 3, wherein said first and second prescribed patterns are complementary such that a thickness of said electrolyte sheet is substantially constant between said first and second prescribed patterns.

5. The fuel cell according to claim 3, wherein said first prescribed pattern is different from said second prescribed pattern.

6. The fuel cell of claim 5, wherein said first and second patterns are selected in dependence on the type of reactants contacting said first and second interfaces, respectively.

7. The fuel cell of claim 1, wherein said prescribed pattern is selected in dependence on the type of reactant contacting said at least one interface.

8. The fuel cell of claim 1, wherein said electrolyte is a polymer.

9. The fuel cell of claim 8, wherein said polymer is a proton-exchange membrane.

10. The fuel cell of claim 8, wherein said polymer is shaped by a method selected from the group consisting of direct casting, injection molding, embossing, laser machining, laminated layer assembly, selective plasma etching, blow molding, and autoclaving.

11. The fuel cell of claim 1, wherein said electrolyte is a solid oxide.

12. The fuel cell of claim 11, wherein said solid oxide is an ion-exchange membrane.

13. The fuel cell of claim 11, wherein said solid oxide is shaped by a method selected from the group consisting of chemical vapor deposition, gel casting, powder sintering, and sol-gel processing.

14. The fuel cell of claim 1, wherein said three-dimensional features further comprise an additional pattern superimposed on said prescribed pattern, said additional pattern and said prescribed pattern having different length scales.

15. The fuel cell of claim 1, wherein said three-dimensional features have widths of between approximately 5 and 500 $\mu$m.

16. The fuel cell of claim 1, wherein said three-dimensional features have depth-to-width aspect ratios greater than approximately 1:2.

17. The fuel cell of claim 1, wherein said electrodes comprise a porous conductive material.

18. The fuel cell according to claim 1, wherein said inlet region and said outlet region communicate with only a portion of said plurality of channels.

19. The fuel cell of claim 1, wherein said plurality of channels comprise continuous serpentine channels and said inlet and outlet regions each communicate with only one channel.

20. A fuel cell comprising:
a) two electrodes; and
b) an electrolyte sheet sandwiched between said electrodes to form an electrode/electrolyte structure, thereby defining first and second interfaces between said electrolyte sheet and said electrodes, at least one of said interfaces having three-dimensional features in a prescribed pattern, wherein said prescribed pattern is selected to direct a flow of a reactant from an inlet region of said fuel cell to an outlet region of said fuel cell, and wherein said prescribed pattern defines a discrete serpentine path for directing said reactant flow therethrough such that said inlet region and said outlet region communicate with respective end portions of said serpentine path, and wherein said electrode/electrolyte structure has a substantially planar peripheral portion surrounding said three-dimensional features of said at least one of said interfaces, said fuel cell further comprising a sealing plate for contacting said substantially planar peripheral portion of said electrode/electrolyte structure to seal said serpentine path.

21. A fuel cell comprising:
a) two electrodes; and
b) an electrolyte sheet sandwiched between said electrodes, thereby defining first and second interfaces between said electrolyte sheet and said electrodes, at least one of said interfaces having three dimensional features in a prescribed pattern, wherein said prescribed pattern is selected to direct flow of reactant from an inlet region of said fuel cell to an outlet region of said fuel cell such that said inlet region and said output region communicate with only a portion of said three-dimensional features, wherein said electrodes each consist of a conductive grid and wherein at least one of said conductive grids associated with said at least one of said interfaces is conformal to said three-dimensional features of said at least one of said interfaces.

22. The fuel cell of claim 15, wherein said at least one of said conductive grids is formed by physical vapor deposition.

* * * * *